United States Patent
Nykanen et al.

(10) Patent No.: US 6,594,483 B2
(45) Date of Patent: Jul. 15, 2003

(54) SYSTEM AND METHOD FOR LOCATION BASED WEB SERVICES

(75) Inventors: Petri Nykanen, Nokia (FI); Juhani Murto, Helsinki (FI); Kari Oinonen, Lempaala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/858,182

(22) Filed: May 15, 2001

(65) Prior Publication Data

US 2002/0173317 A1 Nov. 21, 2002

(51) Int. Cl.7 .......................... H04M 1/66; H04M 3/42; H04M 1/68; H04M 3/16; H04Q 7/20
(52) U.S. Cl. .................. 455/411; 455/456; 455/414
(58) Field of Search .............................. 455/456, 411, 455/412, 414, 404

(56) References Cited

U.S. PATENT DOCUMENTS

| | | | | |
|---|---|---|---|---|
| 6,138,003 A | * | 10/2000 | Kingdon et al. | 455/410 |
| 6,347,227 B1 | * | 2/2002 | Johansson | 455/456 |
| 6,377,810 B1 | * | 4/2002 | Geiger et al. | 455/456 |
| 2001/0018349 A1 | * | 8/2001 | Kinnunen et al. | 455/456 |
| 2002/0077084 A1 | * | 6/2002 | Zellner et al. | 455/414 |
| 2002/0094822 A1 | * | 7/2002 | Anctil et al. | 455/456 |

* cited by examiner

*Primary Examiner*—Nay Maung
*Assistant Examiner*—Raymond Persino
(74) *Attorney, Agent, or Firm*—Morgan & Finnegan, LLP

(57) ABSTRACT

In one embodiment of the invention there is provided a system and method whereby a local application may interface with a single API and be automatically connected to the appropriate source of terminal location information. In another embodiment of the invention there is provided a system and method whereby a remote application and/or web service may interface with a single API and be automatically connected to the appropriate source of terminal location information. In another embodiment of the invention there is provided a system and method whereby a user can specify his privacy preferences to one database and be assured that his preferences would be adhered to by all location providing sources, thereby allowing the user to exact direct control over which applications and web services have access to data concerning the location of his mobile.

20 Claims, 12 Drawing Sheets

FIG.1A-1

| RULE | RULE VARIABLES |
|---|---|
| AllowAllLocationRequests | ALLOWED ACCURACY (FULL; X METER RADIUS); NO |
| DisallowAllLocationRequests | YES; NO |
| AllowTheseRequestersDisallowAllOthers | NO; ARRAY LISTING ALLOWED REQUESTERS OR USE GROUPS AND ALLOWED ACCURACY (FULL; X METER RADIUS) FOR EACH |
| DisallowTheseRequestersAllowAllOthers | NO; ARRAY LISTING DISALLOWED REQUESTERS OR USE GROUPS, SPECIFICATION OF ALLOWED ACCURACY (FULL; X METER RADIUS) FOR "AllOthers" |
| AllowTheseRequestersQueryOnAllOthers | NO; ARRAY LISTING ALLOWED REQUESTERS OR USE GROUPS AND ALLOWED ACCURACY (FULL; X METER RADIUS) FOR EACH |
| DisallowTheseRequestersQueryOnAllOthers | NO; ARRAY LISTING DISALLOWED REQUESTERS OR USE GROUPS |
| QueryOnAllRequesters | YES; NO |

FIG.1A

| FIG.1A-1 | FIG.1A-2 |

FIG.1A-1

| RULE DURATION | LOCATIONS |
|---|---|
| PERMANENT; X TIME UNITS; UNIT X DATE; PERIOD(s) | ALL; ARRAY LISTING LOCATIONS |
| PERMANENT; X TIME UNITS; UNIT X DATE; PERIOD(s) | ALL; ARRAY LISTING LOCATIONS |
| PERMANENT; X TIME UNITS; UNIT X DATE; PERIOD(s) | ALL; ARRAY LISTING LOCATIONS |
| PERMANENT; X TIME UNITS; UNIT X DATE; PERIOD(s) | ALL; ARRAY LISTING LOCATIONS |
| PERMANENT; X TIME UNITS; UNIT X DATE; PERIOD(s) | ALL; ARRAY LISTING LOCATIONS |
| PERMANENT; X TIME UNITS; UNIT X DATE; PERIOD(s) | ALL; ARRAY LISTING LOCATIONS |
| PERMANENT; X TIME UNITS; UNIT X DATE; PERIOD(s) | ALL; ARRAY LISTING LOCATIONS |

SYSTEM AND METHOD FOR LOCATION BASED WEB SERVICES

FIELD OF INVENTION

This invention relates to systems and methods for wireless communications and networking.

BACKGROUND INFORMATION

There exists in the art a number of methods of determining the location of a mobile terminal in a wireless network environment. Some of these methods are terminal-based, while others are network-based. As an example of a terminal-based method, a terminal could contain Global Positioning System (GPS) hardware which allows it to determine its location using the established system of satellites equipped with radio transmitters and atomic clocks. The terminal could then serve the determined location information to requesting parties, terminals, applications, web services, and the like. As an example of a network based method, time of arrival (TOA) measurements could be computed from access bursts generated by a mobile and used to determine the position of a terminal. The use of TOA, enhanced observed time difference (E-TOD), and the like to determine terminal location is noted in the Third Generation Partnership Project (3GPP)'s Location Services (LCS) specification documents TS 23.071 and TS 23.271, included here by reference. As still another example, a terminal could contain Bluetooth hardware which allows it to determine its location by communicating with Bluetooth beacons in the vicinity of the terminal.

Currently, the technique used to request location information is dependent upon the location determining method that will answer the request. Accordingly, an application or web service, for example, would have to use one technique and/or API (application program interface) to request location information from a terminal equipped with GPS hardware and a second technique to request location information from an LCS server.

Moreover, the location determining methods available to a requester can vary with certain factors such as time of day, atmospheric conditions, and available hardware in the network and in the terminal. For example, a mobile may sometimes be in a wireless network which offers LCS but at other times roam to a wireless network which does not.

This reality can create difficulties for designers of applications and services which make use of location information. Applications and services designed to access only certain sources of location information would fail if those sources were not available. For example, suppose an application was designed such that the only technique for accessing location data implemented was one for requesting GPS location data from a terminal. Such an application would not be able to get access to location information if it were used by a terminal which did not have GPS hardware. Ironically, under such circumstances the location based application would not be able to operate properly even if another location determining source, such an LCS server were available.

Application designers might try to get around this problem by building their applications and web services with the ability to access the location information provided by a number of location determining sources. However, such a solution is not ideal. One problem with this solution is that, as described above, different request techniques (such as making calls to different API's) are necessary for requesting location information from different sources. Therefore, allowing access to different location determining sources adds to application size and complexity. Keeping application size small is particularly important in a wireless network environment where transmission bandwidth is often expensive and/or limited, and the memory and/or storage of terminals is often small compared to that found in desktop machines. Furthermore, it may be difficult for developers to choose which location request techniques to include. Developers might be tempted to not include in their programs calls to all available terminal location API's in order to cut down on program size and complexity. However, this would be at the expense of users who would not be able to use the application and/or web service because the location determination method available to them was not supported by the application and/or web service.

Additionally, programs and/or web services designed to include multiple location access techniques would also ideally need to include program code to intelligently choose among the various techniques. Such additional program code would further add to program size while making the design more complicated.

Accordingly, there is a need for a system and method whereby a local application may interface with a single API and be automatically connected to the appropriate source of terminal location information. Similarly, there is a need for a system and method whereby a remote application and/or web service may interface with a single API and be automatically connected to the appropriate source of terminal location information. Ideally, such a system and method would intelligently choose a source of terminal location information for a requesting application or web service based on factors such as the availability and/or appropriateness of each source.

Another issue relevant to applications and web services which make use of location data is one of security and privacy. There are no doubt great benefits to applications and/or web services that make use of location data. For example, having location data allows a web service to provide interactive step-by-step driving directions to a user. However, the potential for abuse of location data by applications and web services exists. Therefore, many users long for control over where location information concerning their terminals is transmitted. To have this control, a user must be able to make sure all sources of location information comply with his wishes concerning privacy.

Therefore, there exists a need for a system and method whereby a user could specify his privacy preferences to one database and be assured that his preferences would be adhered to by all location providing sources, thereby allowing the user to exact direct control over which applications and web services have access to data concerning the location of his mobile.

SUMMARY OF THE INVENTION

In one embodiment of the invention there is provided a system and method whereby a local application may interface with a single API and be automatically connected to the appropriate source of terminal location information. In another embodiment of the invention there is provided a system and method whereby a remote application and/or web service may interface with a single API and be automatically connected to the appropriate source of terminal location information. In another embodiment of the invention there is provided a system and method whereby a user can specify his privacy preferences to one database and be assured that his preferences would be adhered to by all location providing sources, thereby allowing the user to exact direct control over which applications and web services have access to data concerning the location of his mobile.

BRIEF DESCRIPTION OF THE DRAWINGS

FIG. 1a illustrates, for one embodiment of the present invention, a prototypical ruleset which could be implemented in a profile database.

DETAILED DESCRIPTION OF THE INVENTION

Figure 1:
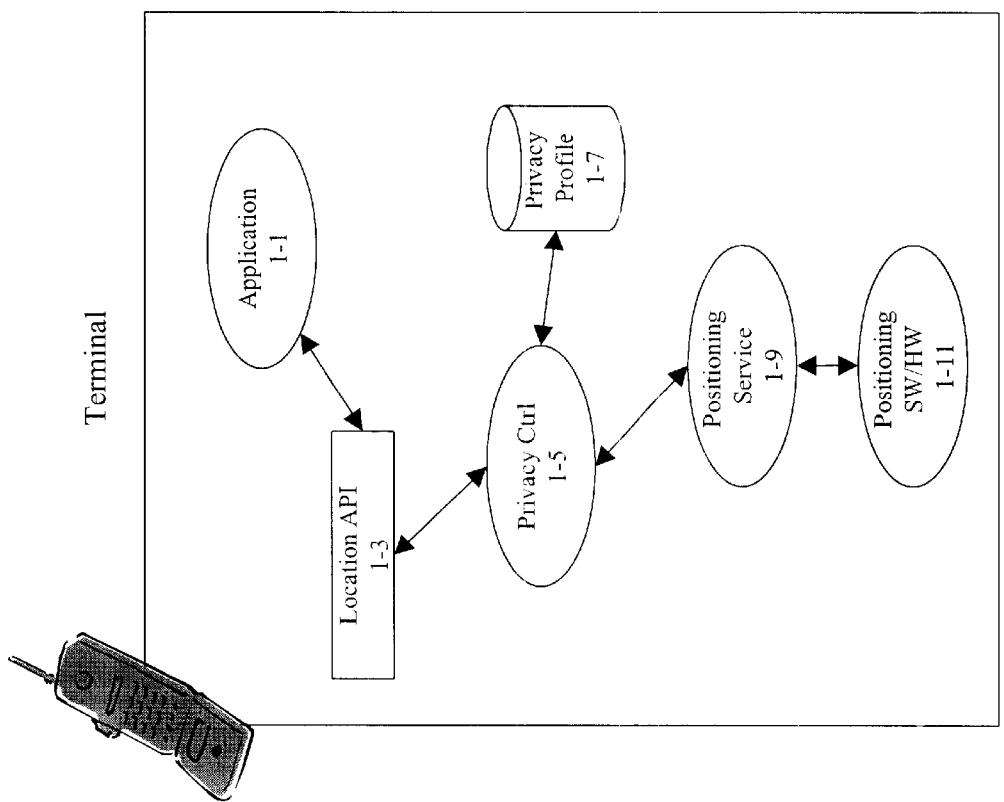
FIG. 1 illustrates, for one embodiment of the present invention, a terminal which allows a user to exact direct control over which local applications have access to data concerning the location of his mobile.

Restricting Access of Local Applications to Terminal Location Data:

FIG. 1 shows an exemplary embodiment of a terminal of the present invention whereby a user may exact direct control over which local applications have access to data concerning the location of his mobile.

In this example, positioning service 1-9 interfaces with positioning hardware and driver 1-11 so as to vend information regarding the location of the terminal. An application 1-1 requests information concerning the location of the terminal via location application program interface (API) 1-3. Location API 1-3 does not communicate directly with positioning service 1-9 but instead forwards data concerning the location information request to privacy control module 1-5. Such forwarded data might include information such as the identity of the application making the request, whether the request is for a single report of the terminal's location or a request to receive periodic updates concerning the terminal's location, and the specifics of the location information request, such as which of latitude, longitude, and altitude data are required, an indication of the purpose for which the information will be used, and the level of accuracy required. Indication of the purpose for which the information will be used may be achieved by defining a number of "use groups" such as "advertisement," "driving directions service," and the like and having an application include its "use group" in its location information request. Use groups could be defined by the user, terminal manufacturer, network operator, or another party. In certain embodiments, an application can be a member of more than one use group.

Using the forwarded data, privacy control module 1-5 interfaces with privacy profile database 1-7 and decides whether to allow or disallow application 1-1's information request. If privacy control module 1-5 decides to grant application 1-1's request, it allows for the transfer of the requested information from positioning service 1-9 to application 1-1. To comply with one or more of the rules described below, privacy control 1-5 might instruct positioning service 1-9 to limit to a certain level the accuracy of the location information provided to application 1-1. This may be implemented by having positioning service 1-9 instruct positioning software/hardware 1-11 to provide it with a specified level of position accuracy, or by having positioning service 1-9 alter the location information received from positioning SW/HW 1-11 before passing it on so as to limit the level of location accuracy. If privacy control module 1-5 decides to disallow application 1-1's request, it would inform application 1-1 of the decision and would not allow the application to receive the requested information.

FIG. 1a shows an example prototypical ruleset which could be implemented in profile database 1-7. Because this is a prototypical ruleset, in each field is an indication of the different values that may be stored there. Each rule is activated or inactivated by setting a value in its respective "Rule Variables" field. For a rule that is inactive, the respective "Rule Variables" field contains the Boolean value "no." For a rule that is active, the "Rule Variables" field may contain "yes" or may contain additional information necessary for the rule to operate. For each active rule, the "Rule Duration" field specifies the amount of time the rule should be in effect. As is evident from the settings noted for this rule's "Rule duration" field in FIG. 1a, the user may select that a rule be in effect until explicitly being disabled ("permanent"), may select that a rule be in effect for a certain number of time units (for example 180 minutes), may specify a particular time when a rule should expire (for example, on Apr. 4, 2004), or may specify a particular time period or periods when the rule should be in effect, such as from 9 a.m. to 5 p.m. Additionally, for each rule the "Locations" field specifies the locations for which the rule should be in effect. When "all" is specified in this field, the corresponding rule is in effect regardless of the terminal's location. When particular locations are specified in an array, perhaps given as radii of specified numbers of meters about specified latitude/longitude coordinates, the rule is only in effect when the user's terminal is in proximity of one of the specified locations. For example, it may be specified that a particular rule only be active in the three locations noted in an array, one of which being within a 500 meter radius of specified geographical coordinates which correspond to a user's office.

In this prototypical ruleset, when the rule "AllowAllLocationRequests" is in effect, access to the terminal's location is granted to any requester which requests it so long as the requested level of accuracy is no greater than the level of accuracy specified in the "Rule Variables" field. For example, it may be specified that requestors only be able to determine the terminal's location to within a 250 meter radius. Alternately, it may be specified that the requestors be allowed to determine the user's location with as much accuracy as possible. Similarly, rule "DisallowAllLocationRequests," when in effect, disallows all location requests.

The rule "AllowTheseRequestersDisallowOthers," when in effect, allows access only to requesters that are noted in the "Rule Variables" field (or that are members of the use groups specified in the "Rule Variables" field) and that request a level of accuracy no higher than that specified for them. Accordingly, the "rule variables" field might contain an array of the names of applications or use groups which further specifies for each the highest level of location accuracy that may be requested. The rule "DisallowTheseRequestersAllowOthers," when in effect, behaves in a similar manner but disallows the specified requesters or use groups from accessing terminal location data for the specified duration of time while allowing others so long as their requests do not exceed the specified allowed location accuracy.

The rule "AllowTheseRequestersQueryOnOthers" is similar to the rule "AllowTheseRequestersDisallowothers," except that the terminal does not categorically disallow access to location data by requesters or use group members not specifically granted access. Instead, when a requester not specially granted location data access requests location data, a query is presented to the user which indicates the requestor and the requested level of location accuracy and which asks the user if he wishes to allow the requester access. The terminal would allow or disallow access depending on the user's response. Such a query may take the form of a dialog box or the like such as is known in the art. The rule "DisallowTheseRequestersQueryOnOthers" behaves in a similar manner but disallows access to terminal location data by the specified requesters and use groups, and queries the user when any requester not denied access makes a request for terminal location data. Finally, if the rule "QueryOnAllRequesters" is in effect, when any requester requests location data a query is presented to the user as above. This query indicates the requestor and the requested level of location accuracy, and asks the user if he wishes to allow the requester access. The terminal would allow or disallow access depending on the user's response.

The terminal could be programmed so that a user's manipulation of a user interface leads to the population and/or alternation of the fields of the ruleset, and to the creation of new rules. In other embodiments, the user could control the remote database via a web browser, perhaps one running on his terminal. In some embodiments, law enforcement officials, emergency services, and the like may be able to override some or all of the restrictions a user has placed on access to information concerning the location of his terminal.

When used in a network compliant with the 3GPP LCS standard, the terminal may receive requests from the network for permission to determine or receive an indication of the location of the user's terminal. According to the present invention, when intended for use in such an environment, the terminal may be designed to present such requests to the user as a dialog box to which the user could respond "yes" or "no." The terminal would then respond to the network's request in compliance with the user's answer. Additionally, the terminal may be designed to allow the user to specify a default response to such requests, perhaps depending on an indication in the network's request as to what the location information will be used for. Alternately, the user may be able to specify that the terminal automatically answer the network requests in compliance with the active ruleset.

Figure 2:
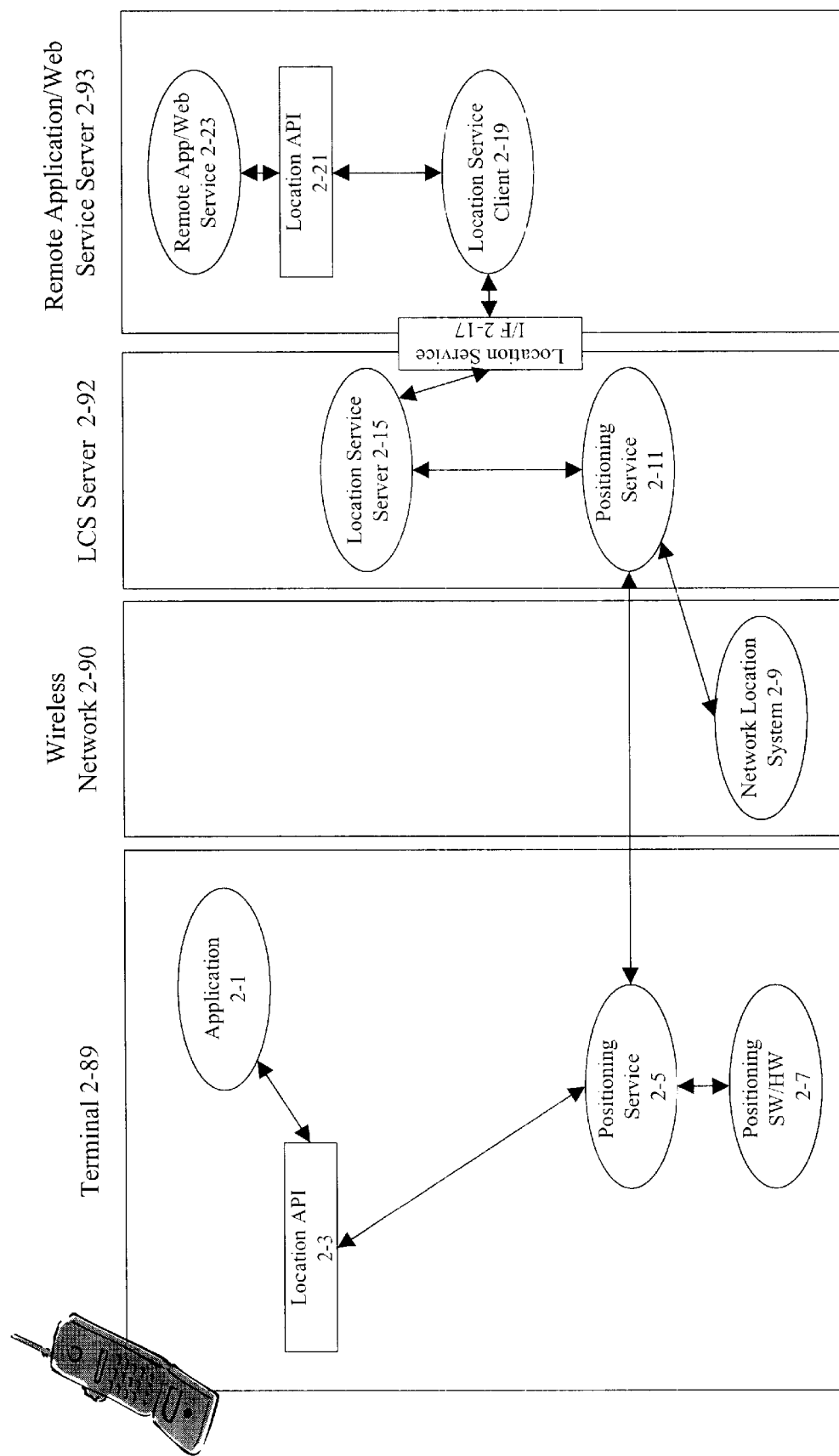
FIG. 2 illustrates an embodiment of the present invention which includes an intelligent positioning service module.

An Intelligent Positioning Service:

FIG. 2 shows an exemplary embodiment of the present invention whereby a local application may interface with a single API and be automatically connected to the appropriate source of terminal location information. Similarly, a remote application and/or web service may interface with a single API and be automatically connected to the appropriate source of terminal location information. Such functionality is provided by intelligent positioning service components 2-5 and 2-11.

In this example intelligent positioning service 2-5 of the terminal 2-89 receives requests for terminal location information which originate from local applications, while intelligent positioning service 2-11 of the LCS server 2-92 receives requests for terminal location information which originate from remote applications and/or web services. More specifically, a local application 2-1 generates a request for terminal location information through location API 2-3 which interfaces with intelligent positioning service 2-5 in the terminal. Similarly, a remote application and/or web service 2-23 generates a request for terminal location information through location API 2-21. Location API 2-21 interfaces with location service client 2-19 of the remote applications/web services server which passes the request to location service server 2-15 of the LCS server via location service interface 2-17. Interface 2-17 represents a network messaging link between components 2-15 and 2-19 using a method known in the art such as simple object access protocol (SOAP) or remote method invocation (RMI). Upon receipt, location service server 2-15 passes the request to intelligent positioning service 2-11.

As seen in FIG. 2, intelligent positioning services 2-5 and 2-11 are interconnected, perhaps using SOAP or RMI over wireless network 2-90. Accordingly, intelligent positioning service 2-5, receiving a request from local application 2-1, may either vend position information generated at terminal positioning hardware 2-7, or vend position information generated by network location system 2-9 and received via intelligent positioning service 2-11 of the LCS server. Upon receipt of the location information, intelligent positioning service 2-5 would forward the information to local application 2-1.

Similarly, intelligent positioning service 2-11, receiving a request from remote application and/or web service 2-23, may either vend position information generated at network location system 2-9, or vend position information generated by terminal positioning hardware 2-7 and received via intelligent positioning service 2-5 of terminal. Upon receipt of the location information, intelligent positioning service 2-11 would forward the information to remote application and/or web service 2-23. In some embodiments, intelligent positioning service 2-11 would receive from network location system 2-9 a direct indication of a terminal's location, such as a numerical representation of a terminal's latitude, longitude, and/or altitude. In other embodiments, intelligent positioning service 2-11 would instead receive from network location system 2-9 values upon which intelligent positioning service 2-11 would need to execute further calculations to determine a mobile's position. This would be the case, for example, if network location system 2-9 furnished intelligent positioning service 2-11 with TOA measurements.

Figures 1, 2A:
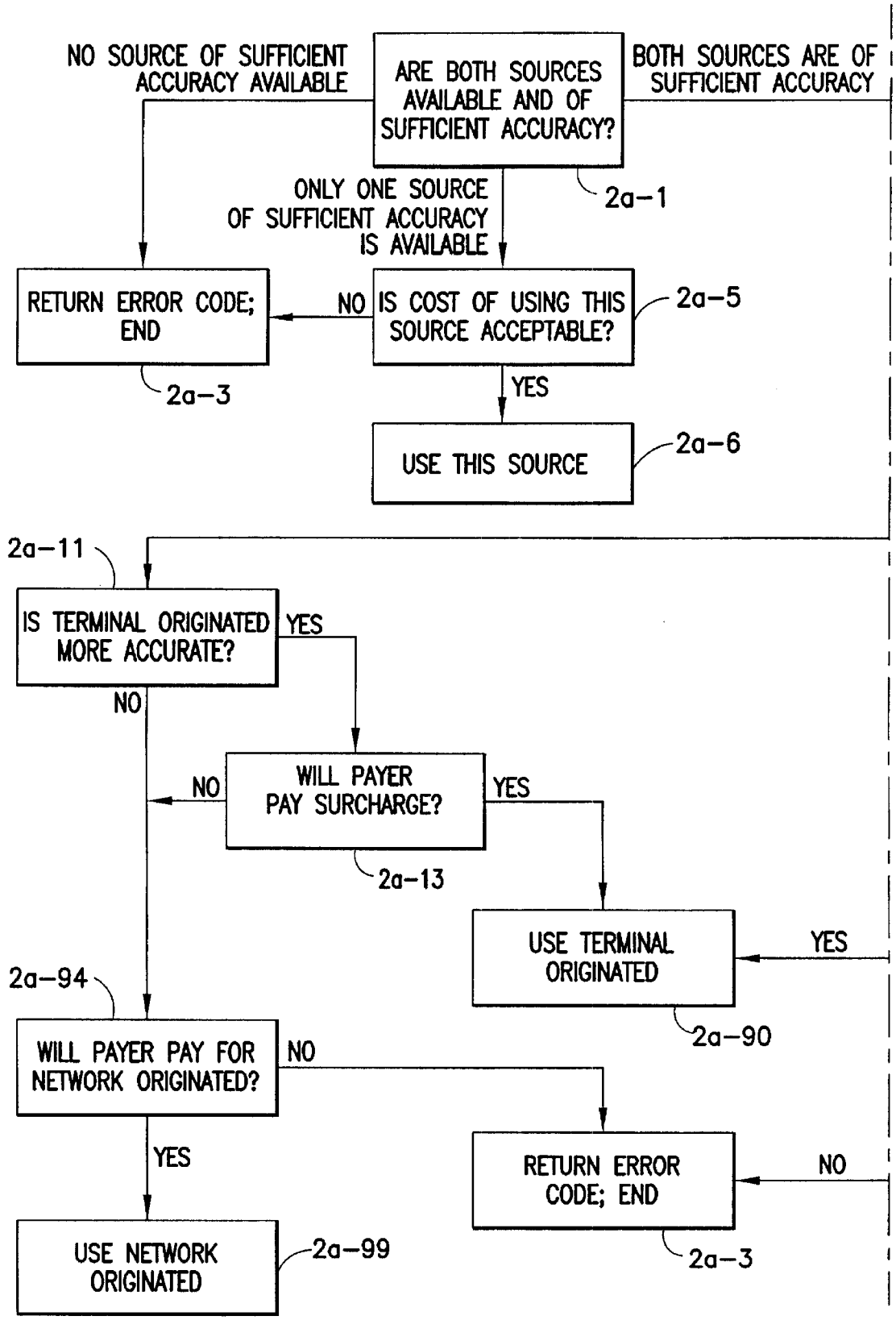
FIG. 2a illustrates an exemplary logic flow used by an intelligent positioning service module to decide the source that it will use for vending location information.
Figures 2, 2A:
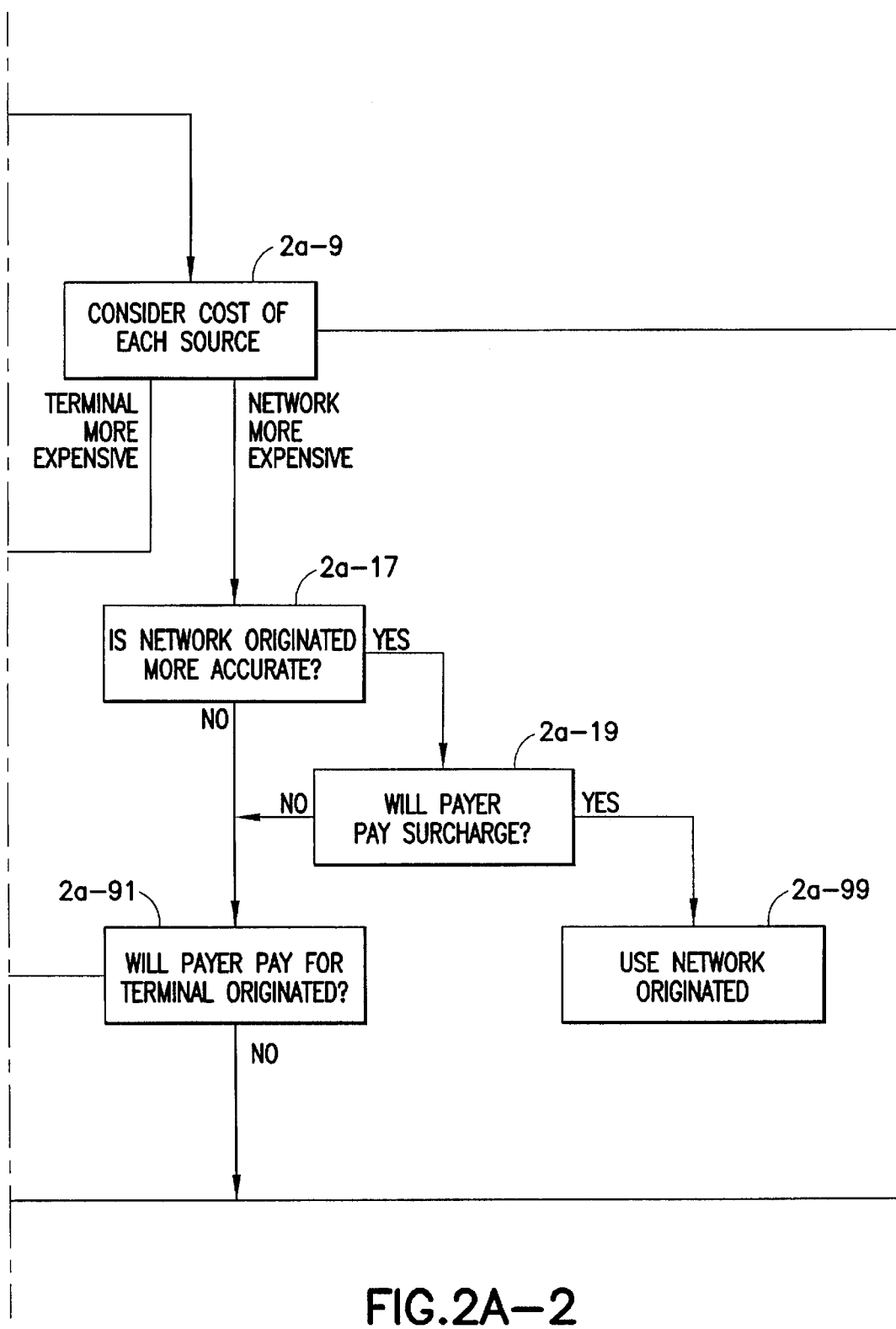

As described above, intelligent positioning service 2-5 may answer a terminal location request from local application 2-1 either with location information generated by terminal positioning hardware 2-7 or with location information generated by the network positioning system. Similarly, intelligent positioning service 2-11 may answer a terminal location request from remote application and/or web service 2-23 either with location information generated by terminal positioning hardware 2-7 or with location information generated by the network positioning system. It is therefore clear that an intelligent positioning service must make a decision as to the source it will use for the location information it vends. FIG. 2a shows an exemplary logic flow involved in making that decision, wherein the intelligent positioning service is equipped to choose between network-originated and terminal-originated sources of location data.

In step 2a-1 the intelligent positioning service determines whether both sources of positioning information are available and of sufficient accuracy. Determination of availability might include determining if a particular source of terminal location information exists and is operational. Determination of sufficient accuracy might include comparing the required level of accuracy indicated in the request with the level of accuracy with which each source is known to be vending location data. The accuracy with which a source is vending location data might be determined by receiving a periodic accuracy report from each source, by querying each source for accuracy information, computing accuracy based on location data vended from each source, technical data sheets for the sources, and the like. If no source is available or of sufficient accuracy, flow proceeds to step 8a-3 were the process terminates with an error code which is forwarded to the requester (the local application or remote application and/or web service).

In certain environments, fees may be charged for the use of terminal location information. Such fees may be charged, for example, to users or web service providers. Accordingly, in the case where only one source is available and of sufficient accuracy, flow proceeds to step 2a-5 where it is determined if the cost of using the source is acceptable to the one who will pay for the information. Accordingly, in some embodiments, a request for data will include a maximum cost that will be paid for the data. In another scenario, the intelligent positioning service may query the one who will be paying for the data or query a machine authorized to make such decisions on behalf of the one who will be paying. The cost of using a particular source of the data might be found by querying the source or by receiving periodic reports of service cost form the source. If the cost for using this source is found to be acceptable, flow proceeds to step 2-a6 where the one available source is used. Otherwise, flow proceeds to step 2a-3 where the flow terminates with an error code as above.

If in step 2a-1 it is determined that both sources are available and of sufficient accuracy, flow proceeds to step 2a-9 where the cost of using each source is compared. If It is found that using terminal-originated location information is more expensive, flow proceeds to step 2a-11 where it is determined if terminal-originated location information is more accurate than network-originated terminal location information. If it is, flow proceeds to step 2a-13 where it is determined whether the payer will pay for the increased accuracy. Accordingly, in some embodiments, a location information request may include some indication of what surcharge is acceptable for higher quality location information. Alternately, the intelligent positioning service may query the one who will be paying for the data and/or a machine authorized to make the decision for that individual or entity.

If it is determined that the payer will pay for increased accuracy, flow proceeds to step 2a-90 where terminal-originated network location information is used. If in steps 2a-11 or 2a-13 an Boolean answer of "no" is determined, flow proceeds to step 2a-94 where it is determined if the payer is willing to pay for the cost of using network originated terminal location information. If it is determined that the payer is willing to pay the cost, flow proceeds to step 2a-99 where network-originated location information is used. Otherwise, flow proceeds to step 2a-3 where the flow terminates with an error code.

If in step 2a-9 it is determined that network-originated location information costs more than terminal originated location information, in step 2a-17 it is determined if network-originated location information is more accurate than terminal originated location information. If it is, it is determined in step 2a-19 whether the payer is willing to pay the surcharge for the increased accuracy. If not, or if a Boolean answer of "no" was generated in step 2a-17, flow proceeds to step 2a-91 where it is determined if the payer is willing to pay the price of using terminal-originated location information. If the answer is yes, flow proceeds to step 2a-90 where terminal-originated location information is used. Otherwise, flow proceeds to step 2a-3 where the flow terminates with an error code. If in step 2a-19 it is determined that the payer will pay the surcharge for increased accuracy, flow proceeds to step 2a-99 where network originated location information is used.

Finally, if in step 2a-9 it is determined that network originated and terminal originated location information cost the same amount of money, flow proceeds to step 2a-21 where it is determined if the cost common to both is acceptable to the payer. If not, flow terminates with step 2a-3 and an error code is returned as described above. Otherwise, flow proceeds to step 2a-23 where the intelligent positioning server compares the accuracy of the two sources of location information. If terminal-originated location information is found to be more accurate, flow proceeds to step 2a-90 where that source is used. If network originated location information is found to be more accurate, flow proceeds to step 2a-99 where that source is used. If the two sources are found to be of equal accuracy, flow proceeds to step 2a-25 where a randomizing function, such as is known in the art, it used to determine whether to use network-originated or terminal-originated location information. This serves to essentially "flip a coin" to decide which source to use when both sources are of equal cost and accuracy, and may serve to balance requests between the two sources. Based on the results of the randomizing function, flow proceeds to either step 2a-90 where terminal-originated location information is used or step 2a-99 where network-originated location information is used.

Figures 2, 2A, 3:
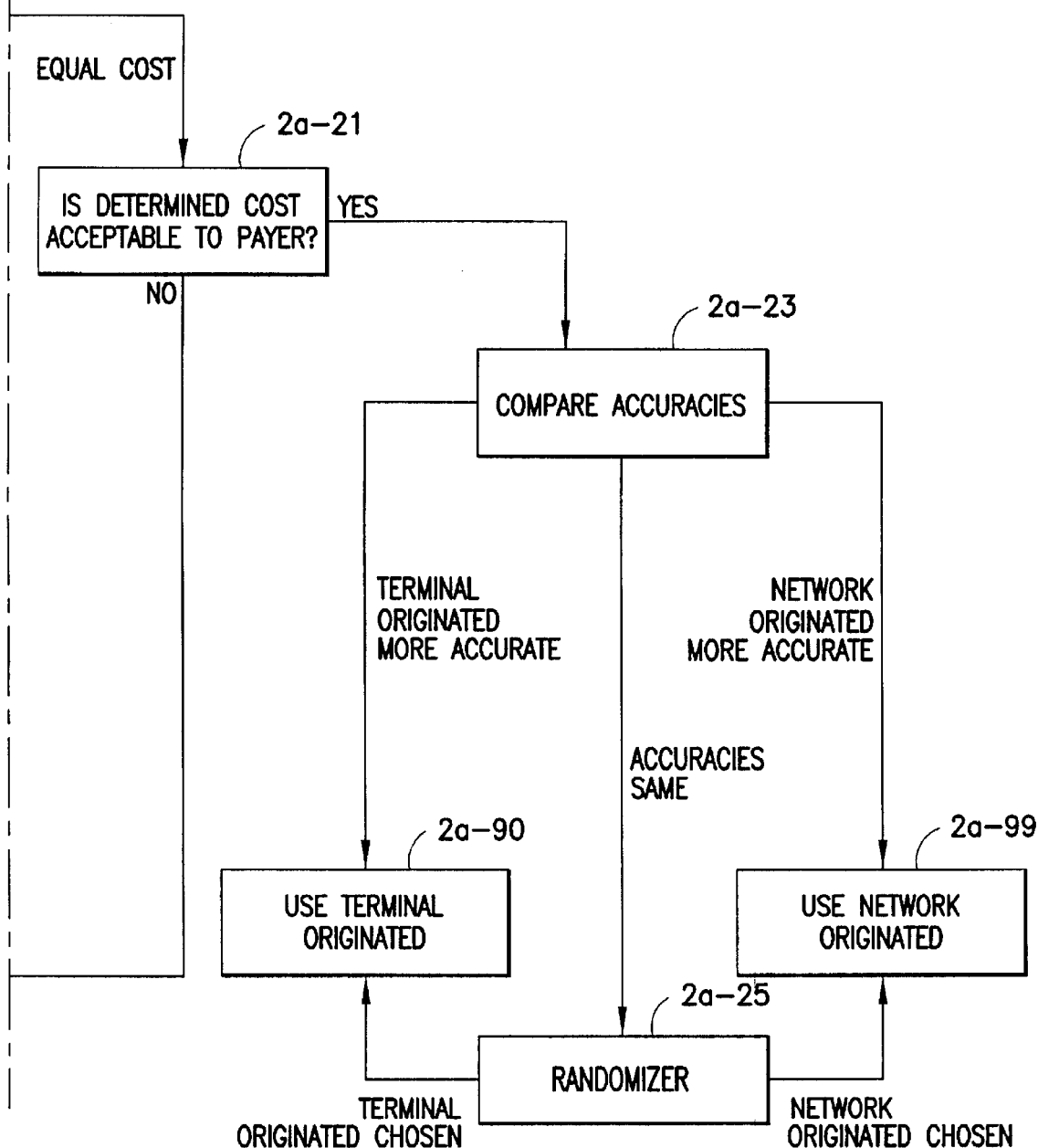
FIG. 3 illustrates an exemplary embodiment of a system of the present invention employing both restriction of local applications' access to terminal location data and an intelligent positioning service.
Figure 3:
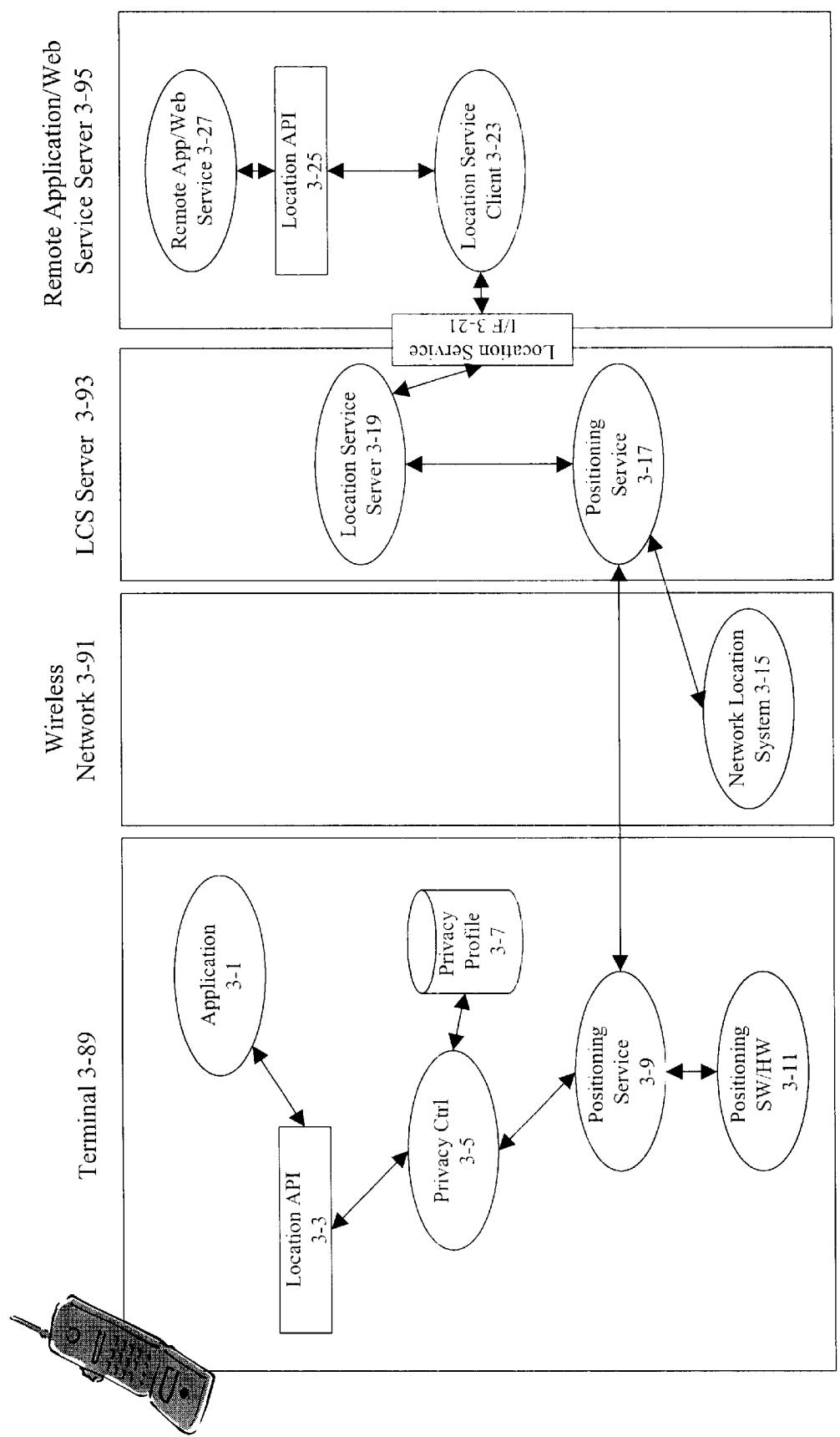

An Intelligent Positioning Service Combined With Restriction of Local Applications' Access to Terminal Location Data:

FIG. 3 shows an exemplary embodiment of the present invention like that depicted in FIG. 2 with the addition to the terminal of privacy control 3-5 and privacy profile database 3-7. As described in FIG. 1, privacy control 3-5 makes local application 3-1 subject to a user's privacy preferences. In this embodiment, the terminal of FIG. 3 has its intelligent positioning service 3-9 in communication with intelligent positioning service 3-17 of the LCS server so that the privacy preferences to which local application 3-1 is made subject effect not only its access to terminal position information which originates in terminal positioning hardware 3-11 but also its access to terminal position information which originates in network location system 3-15. To comply with one or more of the rules contained in privacy profile database 3-7, privacy control 3-5 might instruct intelligent positioning service 3-9 to limit to a certain level the accuracy of the location information provided to application 3-1. This may be implemented by having intelligent positioning service 3-9 instruct positioning SW/HW 3-11 or intelligent positioning service 3-17 to provide it with a specified level of position accuracy, or by having positioning service 1-9 alter the location information received before passing it on so as to limit the level of location accuracy.

Figure 4:
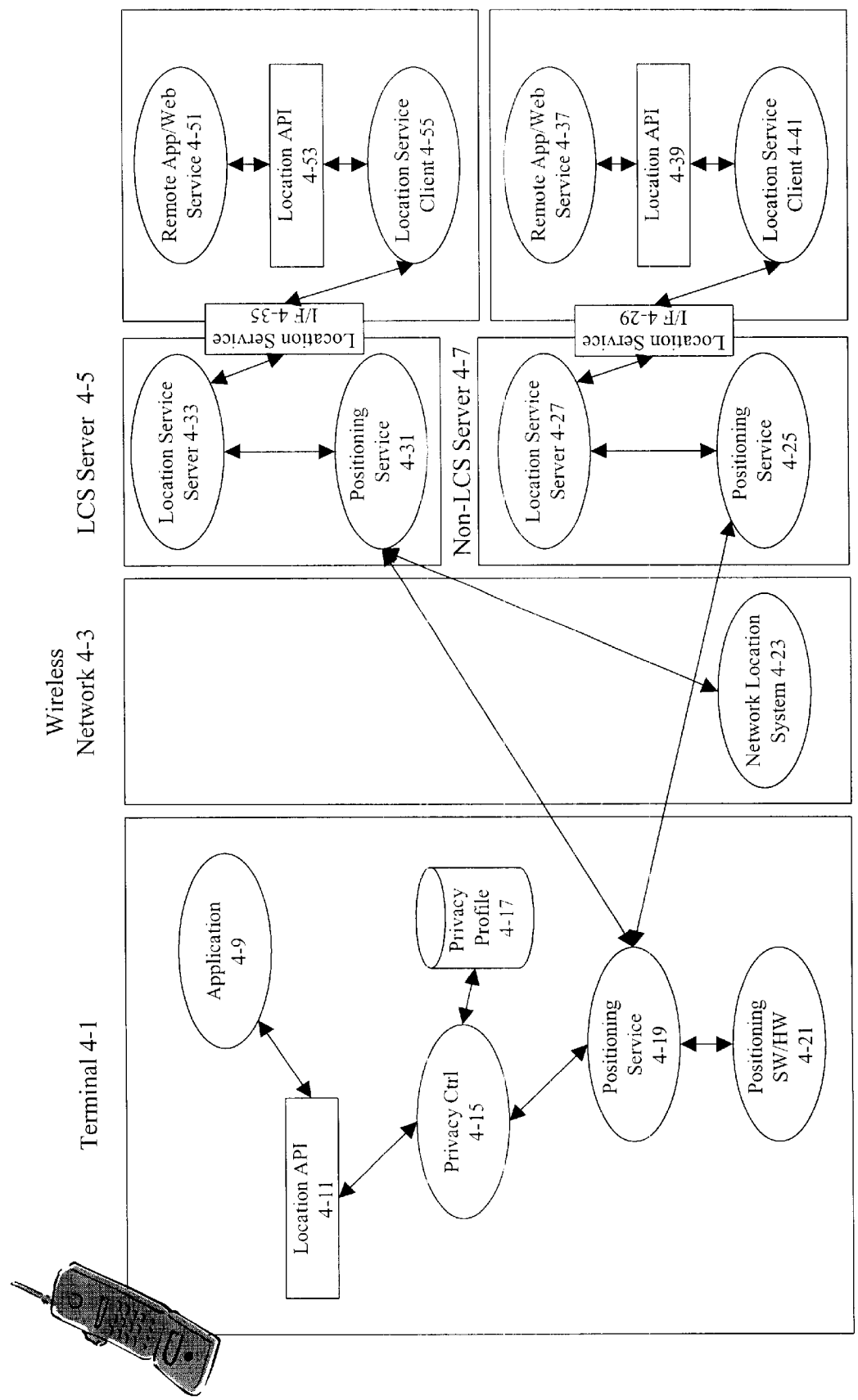
FIG. 4 illustrates an exemplary embodiment of a system of the present invention wherein remote applications and/or web services are allowed access to network-originated terminal location information via a non-LCS server.

Allowing Remote Applications and/or Web Services Access to Network-Originated Terminal Location Information Via a Non-LCS Server:

FIG. 4 shows an exemplary embodiment of the present invention similar to that depicted in FIG. 3 with the addition of non-LCS location server 4-7. Non-LCS location server 4-7 is similar to the previously described LCS location server (shown here as element 4-5) in that it offers remote applications and/or web services access to terminal location information, but differs insofar as its intelligent positioning service 4-25 lacks direct access to network location system 4-23. This might be the case, for example, if non-LCS location vendor 4-7 were operated by a independent entity to whom the network operator was unwilling to extend direct network location system 4-23 access.

Because intelligent positioning service 4-25 lacks direct access to network location system 4-23 it must pass all terminal location requests to intelligent positioning service 4-19 of the terminal. Despite this, remote application and/or web services which seek terminal location information form non-LCS location server 4-7 may still receive terminal location information which originates from network location system 4-23.

Upon receiving a terminal location request from remote application and/or web service 4-37, intelligent positioning service 4-25 passes the request to intelligent positioning service 4-19. Upon receipt of the location request from intelligent positioning service 4-25, intelligent positioning service 4-19 decides whether to meet the request using terminal location information originating from terminal positioning hardware 4-21 or using terminal location information originating from network location system 4-23. This decision process is analogous to that described in references to FIGS. 2 and 2a.

In the case where intelligent positioning service 4-19 decides to meet the request using location information originating from terminal positioning hardware 4-21, the intelligent positioning service 4-19 would act in an analogous manner to that described in reference to FIG. 3.

In the case where intelligent positioning service 4-19 decides to meet the request using location information originating from network location system 4-23, intelligent positioning service 4-19 requests the location information from intelligent positioning service 4-31 of LCS location server 4-5. Intelligent positioning service 4-31 would then return the requested location information to intelligent positioning service 4-19. Intelligent positioning service 4-19 would, in turn, pass the received location information to intelligent positioning service 4-25 which would then forward the location information to remote application or web service 4-37.

In this way, remote applications and web services requesting terminal location information from non-LCS server 4-7 may receive terminal location information which originates from network location system 4-23 despite that fact that non-LCS server 4-7 lacks direct access to this database. Intelligent positioning service 4-31 would not be aware that the terminal location request originated from remote application and/or web service 4-37 connected to non-LCS server 4-7 rather than from within terminal 4-1.

In certain embodiments of the invention, instead of or in addition to terminal 4-1 providing LCS server 4-5 or non-LCS server 4-7 with terminal-originated location information only upon request, terminal 4-1 may provide this information to servers 4-5 and 4-7 periodically and/or whenever the terminal's location changes by a distance of more than a specified amount. LCS server 4-5 and 4-7 non-LCS server 4-7 could cache the received terminal-originated location information on a storage medium, updating it as new information were received. Accordingly, when LCS server 4-5 or non-LCS server 4-7 came to require terminal-based location information relating to a terminal 4-1 in order to respond to a terminal location request by a remote application or web service, the server could fulfil the request by accessing the data from the storage medium rather than having to request it from the terminal. This could provide the benefit of making for less traffic over the wireless link to the terminal.

Figure 5:
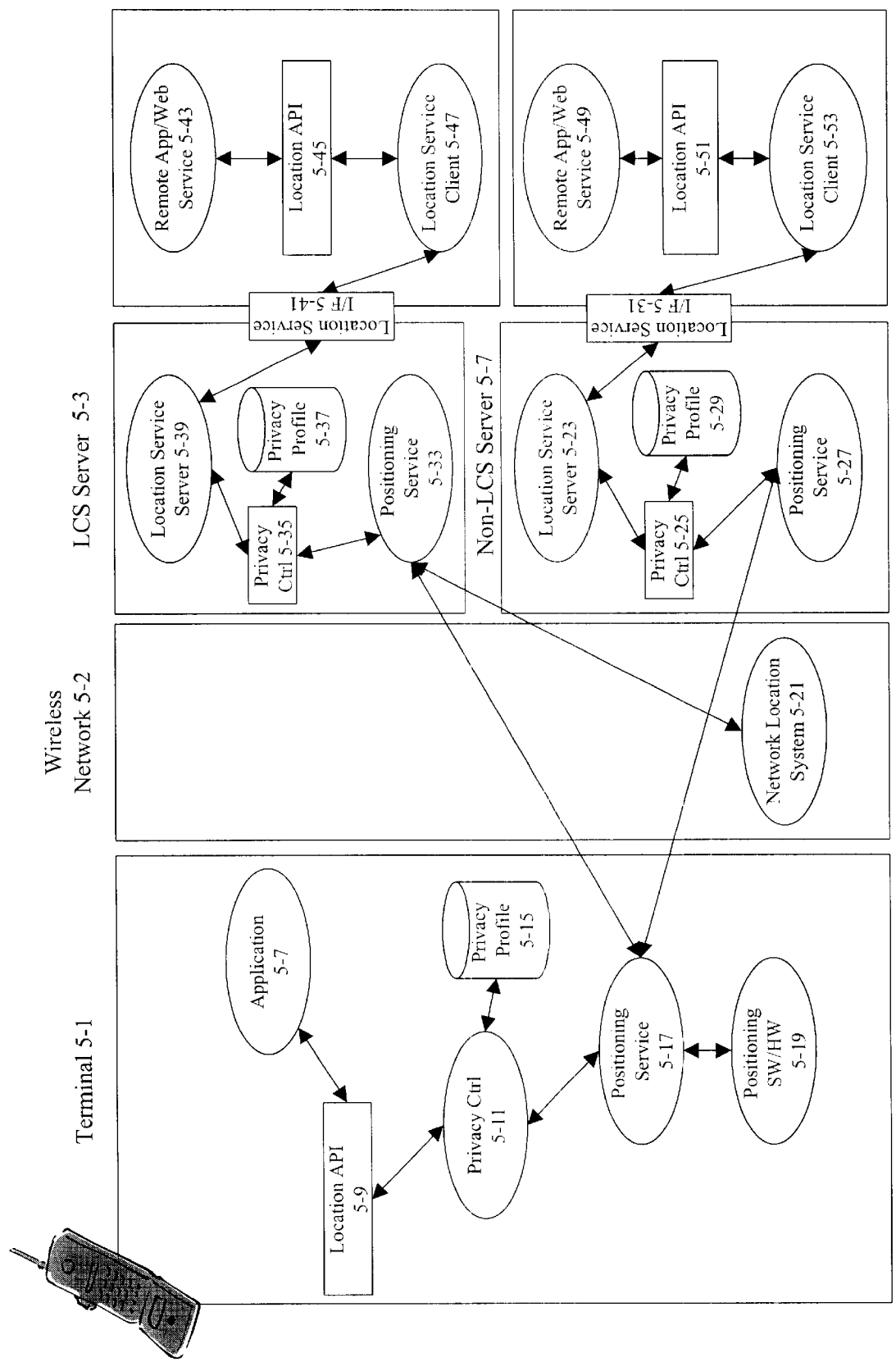
FIG. 5 illustrates an exemplary embodiment of a system of the present invention employing an intelligent positioning service and restriction of both local application and remote application and/or web service access to terminal location data.

An Intelligent Positioning Service Combined With Restriction of Both Local Application and Remote Application and/or Web Service Access to Terminal Location Data:

FIG. 5 shows an exemplary embodiment of the present invention similar to that depicted in FIG. 4 with the addition of privacy control 5-25 and privacy profile 5-29 in non-LCS location server 5-5, and the addition of privacy control 5-35 and privacy profile 5-37 in LCS location server 5-3. Through the addition of these elements, remote applications and/or web services which request terminal location information are also made subject to the privacy preferences of the user.

The technique used by these privacy control modules 5-25 and 5-35 for making requesting applications and web services subject to a user's privacy preferences is analogous to that described in reference to FIG. 1. Privacy control modules 5-25 and 5-35 access privacy preferences from privacy profile databases 5-29 and 5-37 respectively. These privacy profile databases contain replicas of the data contained in "master" privacy profile database 5-15 of the terminal. These "replica" privacy profile databases would be updated periodically, and/or when changes were made to the master privacy profile database. Accordingly, remote applications and/or web services requesting terminal location information via LCS location server 5-3 or non-LCS location server 5-5 are made subject to the rules contained in the privacy profile database 5-15. Since this privacy profile database is direct control of the user (as explained in references to FIGS. 1 and 1a), the user is in direct control over the access of remote applications and/or web services to information concerning the location of his mobile.

In other embodiments, a privacy profile database other than 5-15 could act as the master privacy profile database. For example, privacy profile database 5-29 could act as the master database such that privacy profile databases 5-37 and 5-17 would contain replicas (updated periodically, and/or when changes were made) of the data contained in privacy profile database 5-29 of non-LCS server 5-7. In the case where privacy profile database 5-29 or 5-37 were the master database, the user could control his privacy settings remotely. Accordingly, the terminal could be programmed so that a user's manipulation of a user interface leads to the population and/or alternation of the fields of the ruleset contained in the remote master privacy profile database. Techniques such as Simple Object Access Protocol (SOAP), Java Message Service (JMS), or Remote Methods Invocation (RMI) could be used achieve manipulation of the remote database. In other embodiments, the user could control the remote database via a web browser, perhaps one running on his terminal.

The decision as to which of the 5-15, 5-33, and 5-29 should be the master privacy profile database could be made in a number of ways. For example, privacy profile database 5-15 could be chosen as the master database to enhance a given user's confidence in the privacy of the system by giving him physical possession of the master database. In other cases, the decision could be a dynamic one based on whether more requests were being made by local or remote requestors. For example, the master database might be 5-15 for a period of time when the user is mostly making use of local location-based applications and then become database 5-29 or 5-37 if he entered a period of time when he was mostly using remote location-based applications and/or web services.

In certain embodiments, if a piece of data were not found in one database, it would be searched for among the other databases. For example, suppose a piece of data (such as a rule or portion thereof) was in a damaged state in privacy profile database 5-37. In such a case, privacy control module 5-35 might query the other privacy control modules 5-25 and 5-11 to see if their privacy profile databases (5-29 and 5-15 respectively) contained an undamaged copy of that piece of data. Upon finding an undamaged copy of the piece of data, privacy control module 5-35 could request the piece of data from the appropriate privacy control module. Such communications could be implemented using techniques such as Simple Object Access Protocol (SOAP), Java Message Service (JMS), or Remote Methods Invocation (RMI). In some embodiments, the communications may be encrypted.

In certain embodiments, there is not propagation of data from one privacy profile database to the other privacy profile databases. Instead, a particular piece of data such as a rule or portion thereof would be placed on only one of the databases, and upon each of the other databases would be placed a link to the actual data. In the case where a link were damaged, a search analogous to the one described above may be performed with the goal of reestablishing the damaged link.

The ruleset contained in the privacy profile databases 5-15, 5-29, and/or 5-37 might contain additional rules beyond those shown in the exemplary ruleset of FIG. 1*a*, such as rules which take into consideration whether a requester was a local application or a remote application and/or web service. Additionally, a first use group could be defined which included all local applications and a second use group could be defined which included all remote applications and/or web services. Accordingly, by choosing the rule "AllowTheseReqestersQueryOnAll Others" with the local applications use group specified in the "Rule Variables" field, a user could choose to allow all local applications access to the data concerning the terminal's location but be queried before forwarding such data to requesting remote applications and/or web services.

As before, an application or web service could be a member of more than one use group. For example a web service's request for terminal location information might include a declaration that the web service is a member of the use groups "remote" and "driving directions service." Remote applications and web services could be identified in the "Rule Variables" field by listing the application or service name, the URL (universal resource locator) of the application or service, or by another way of identifying applications and web services that is known in the art.

To comply with one or more of the rules in the privacy profile databases 5-15, 529, and/or 5-37, privacy control 5-11 might instruct intelligent positioning service 5-17 to limit to a certain level the accuracy of the location information provided to application 5-7. This may be implemented by having intelligent positioning service 5-17 instruct positioning SW/HW 5-19 or intelligent positioning service 5-33 to provide it with a specified level of position accuracy, or by having positioning service 5-17 alter the location information received before passing it on so as to limit the level of location accuracy. Analogous operations may be performed by intelligent positioning service 5-27 and intelligent positioning service 5-33.

Figure 6:
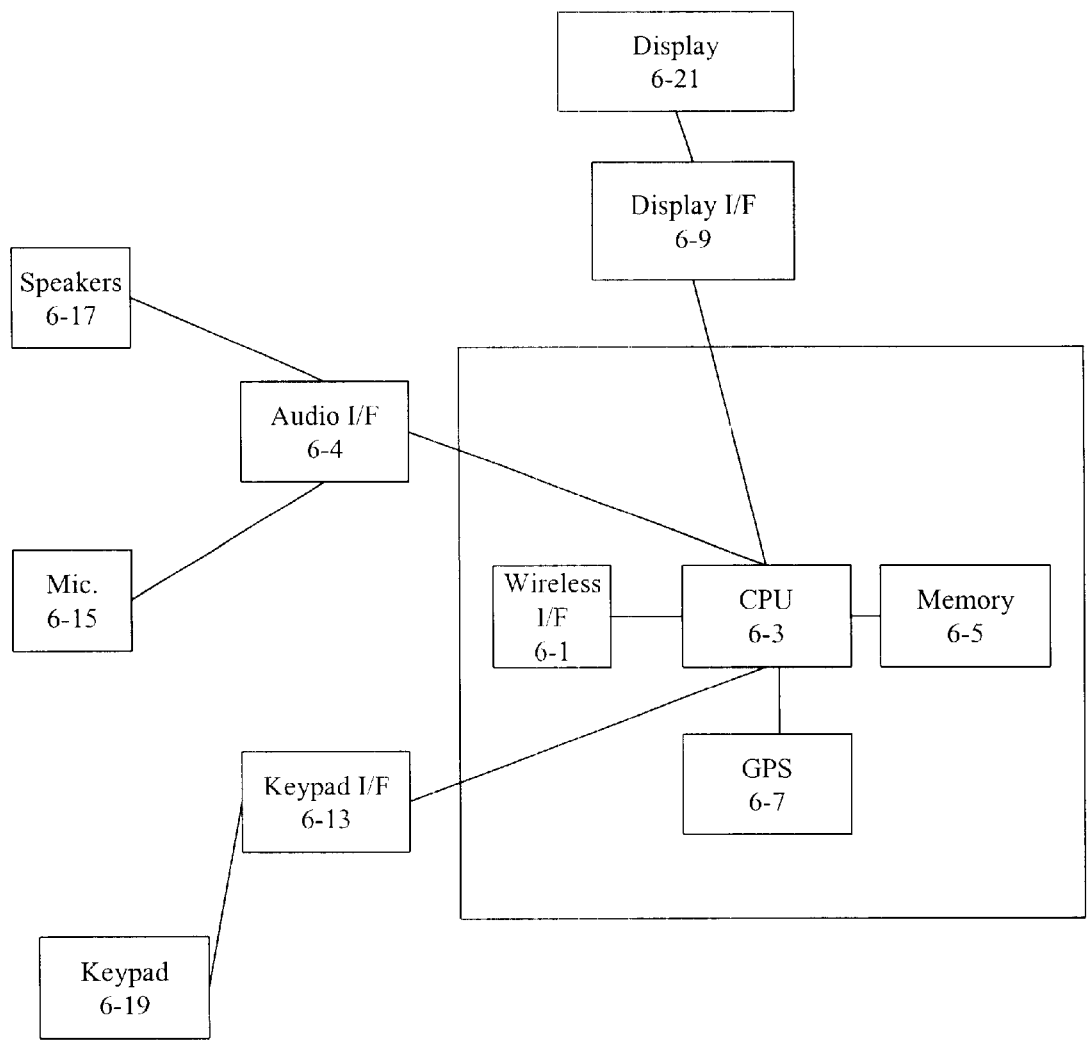
FIG. 6 shows an exemplary embodiment of a terminal of the present invention.

Hardware:

FIG. 6 shows an exemplary embodiment of a terminal of the present invention. Processing unit 6-3 is ideally a processor designed for use in a mobile and/or portable environment, such as an Intel StrongARM. Operatively connected to processor 6-3 is wireless network interface 6-1, memory 6-5, GPS (global positioning service) hardware and interface 6-7, keypad interface 6-13, display interface 6-9, and audio interface 6-4.

Wireless network interface 6-1 offers the terminal an interface to the wireless network and may be implemented using an 802.11, GSM, 3G, or similar interface such as is known in the art. Display 6-21 and keypad 6-19 are provided to allow the user to interact with the terminal. In some embodiments display 6-21 may be touch sensitive, perhaps eliminating the need for a separate keypad 6-19. Audio interface 6-4, along with attached speaker 6-17 and microphone 6-15, allow the terminal to be used for telephonic communication. The speaker 6-17 may also be used to provide audio and voice prompts to the user, while microphone 6-15 may be used to accept voice commands from the user. Optional GPS hardware provides the terminal with knowledge of its physical location. In some embodiments, GPS hardware may be replaced with or augmented by hardware capable of receiving location information from Bluetooth beacons.

Memory 6-5 may comprise RAM, ROM, or mass storage such as a hard drive. Memory 6-5 may contain program code, data, and the like whereby processor 6-3 may execute and/or modify the program code and modify and/or access the data.

The terminal ideally runs an operating system designed for the mobile and/or portable environment such as Symbian EPOC, Microsoft Windows CE, or a mobile-orientated build of Linux. The operating system may additionally provide an execution environment such as Java.

Figure 7:
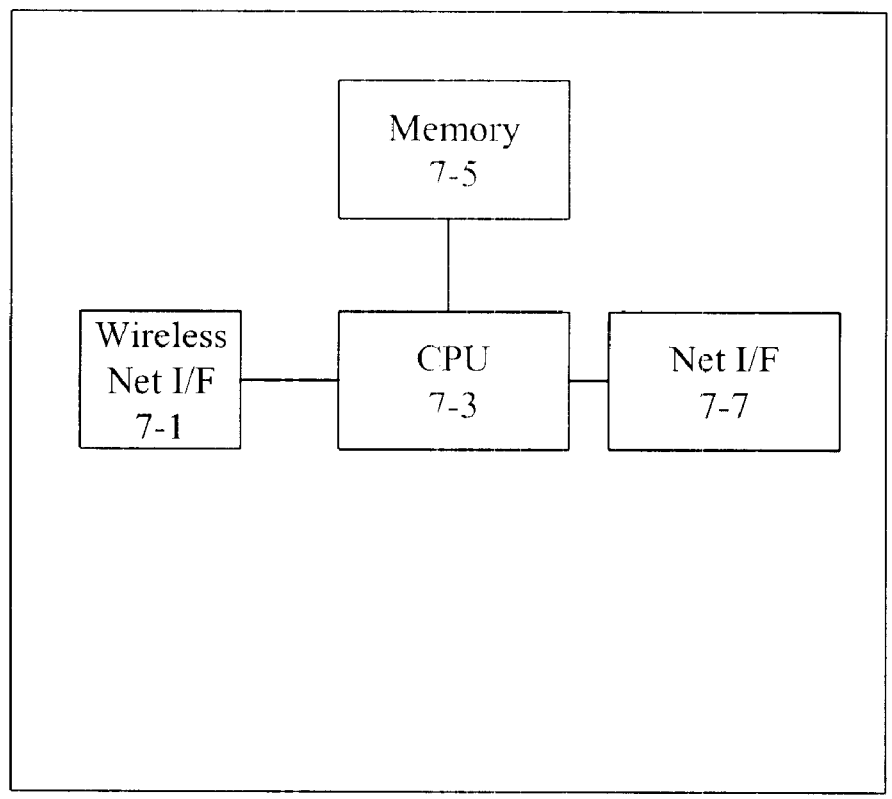
FIG. 7 shows an exemplary LCS or non-LCS terminal location server of the present invention.

FIG. 7 shows an exemplary LCS or non-LCS location server. The server may be implemented using a general purpose computer or workstation such as a Sun SPARCstation, Dell PowerEdge, or Macintosh G4. Processor 7-3 is a general purpose processor such as a Sun SuperSPARC, an Intel Pentium-series processor, or an Intel or IBM PowerPC-series processor. In this example, processor 7-3 is operatively connected to wireless network interface 7-1, wire network interface 7-7, and memory 7-5.

Wireless network interface 7-1 offers the server an interface to the wireless network and may be implemented using an 802.11, GSM, 3G, or similar interface such as is known in the art. Wire network interface 7-7 provides an interface to a wired network and may be implemented using an Ethernet interface such as in known in the art. In some embodiments, network interface 7-7 may be replaced with a wireless network interface such as an 802.11 interface. In still other embodiments, network 7-7 may be eliminated by having the server rely on interface 7-1 for its connectivity needs.

Memory 7-5 may comprise RAM, ROM, or mass storage such as a hard drive. Memory 7-5 may contain program code, data, and the like whereby processor 7-3 may execute and/or modify the program code and modify and/or access the data.

The server may use a standard operating system such as Apple OS X, Microsoft Windows, or UNIX. Additionally, an execution environment such as Java may be provided.

In embodiments where compatibility with 3GPP's LCS standard is desired, the Network Location System (2-9, 3-15, 4-23, or 5-21) noted herein may comprise a gateway mobile location center (GMLC), a serving mobile location center (SMLC), a mobile switching center (MLC), a visitor location register (VLR), a home location register (HLR), base station subsystem (BSS), and a location measurement unit (LMU), these components being described in 3GPP specification documents TS 23.071 and TS 23.271, included herein by reference.

Software:

The functionality described herein may be achieved via a number of programming methods known in the art. For example, an object oriented language such as Java may be used. With reference to FIG. 5, components such as the privacy control components 511 and 5-25 and intelligent positioning services 5-17 and 5-33 could be programmed as classes and instantiated into objects. In embodiments of the invention where intelligent positioning service 5-23 receives measurements (such as TOA or E-OTD measurements) rather than a direct indication of a mobile's location, the intelligent positioning service class may additionally include code to compute from such measurements the location of a mobile. Such additional code may be crafted according to 3GPP LCS specifications documents 23.071 and 23.271.

Communication between components running on the same machine could be achieved using object-to-object and/or interprocess messaging such as is known in the art. Communications over a network, such as the communication between location service client 553 and service server 5-23 could be achieved using Simple Object Access Protocol (SOAP), Java Message Service (JMS), or Remote Methods Invocation (RMI), depicted as location service I/F 5-31. JMS, SOAP, or RMI could also be used for communication between intelligent positioning service component 5-33 and network location system 5-21. In embodiments where intelligent positioning service 5-33 is to communicate with a network location system 5-21 compliant with 3GPP LCS, intelligent positioning service 5-21 could be programmed to access the GMLC of the network location system 5-24 in compliance with the 3GPP standard as stated in TS 23.071 and TS 23.271. The transmission of the contents of terminal privacy profile database 5-15 to remote privacy profile databases 5-29 and 5-37 can be achieved using the techniques of replicated databases known in the art such that, for example, the contents of privacy profile database 5-15 would be transmitted in an encrypted format over the wireless network to privacy profile databases 5-29 and 5-37 at periodic intervals and/or whenever changes are made to database 5-15. When communications or other transmissions of data are to occur over a network between various components and/or devices, it may be desirable to use encryption methods such as are known in the art.

Terminal privacy profile database 5-15 can be populated and updated, for example, by presenting the user of the terminal with a user interface (U/I). By manipulating the U/I, the user could activate, inactive, and create rules as well as change and set the properties of rules.

For example, a user could activate or inactivate a rule by via the U/I by toggling a checkbox graphically located next to a description of the rule. Also graphically next to the description of the rule could be fill-in fields or pull-down menus whereby the user could set factors such as the duration the rule should be in effect or the applications, services, and/or groups to which the rule should be applied. Buttons labeled "add rule" and "add use group" in the U/I could respectively allow a user to define his own rules and use groups using a scripting or graphical interface.

Ramifications and Scope:

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention. Accordingly, it is intended that the present invention cover its modifications and variations provided they come within the scope of the appended claims and their equivalents. In this context, "equivalents" means each and every implementation for carrying out the functions in the claims, even if not explicitly described herein.

Furthermore, it is specifically noted that it is only for purposes of illustration that certain figures show only one of various components such as terminals, LCS servers, Non-LCS servers, application and web service servers. In reality, a plurality of each of these components may exist. For example, FIG. 2 shows only one terminal 2-89, only one LCS server 2-92, and only one remote application and web service server 2-93. However, in reality a plurality of terminals 2-89 and LCS servers 2-92 may exist, with a plurality of remote application and web service servers 2-93 in communication with each of the LCS servers.

We claim:

1. A method of providing location information to a local application comprising the steps of:
   receiving from a local application a request for location information concerning a terminal upon which it is stored;
   consulting a database containing privacy preferences, said database being located in the terminal but having its contents mirrored at one or more remote databases;
   determining whether said local application is entitled to receive the requested location information;
   determining what source from a set of potential sources to use to provide said local application with the requested location information; and
   providing to said local application location information which originated from the determined source in the case where it is determined that said local application is entitled to receive it.

2. The method of claim 1, wherein said determining step includes determining the operational status of each of said potential sources.

3. The method of claim 1, wherein said determining step includes determining the accuracy of the information provided by each of said potential sources.

4. The method of claim 1 wherein said determining step includes determining the cost of obtaining the information from each of said potential sources.

5. A method for providing location information to a remote application or web service comprising the steps of:
   receiving from a remote application or web service a request for location information concerning a terminal;
   consulting a database not located within the terminal which contains a mirror of the privacy preferences stored in a database located within the terminal;
   determining whether said remote application or web service is entitled to receive the requested location information;
   determining what source from a set of potential sources to use to provide said remote application or web service with the requested location information; and providing to said remote application or web service location information which originated from the determined source in the case where it is determined that said remote application or web service is entitled to receive it.

6. The method of claim 5, wherein said determining step includes determining the operational status of each of said potential sources.

7. The method of claim 5, wherein said determining step includes determining the accuracy of the information provided by each of said potential sources.

8. The method of claim 5, wherein said determining step includes determining the cost of obtaining the information from each of said potential sources.

9. A system of providing location information to a local application comprising:
    a memory having program code stored therein; and
    a processor connected to said memory for carrying out instructions in accordance with said stored program code;
    wherein said program code, when executed by said processor, causes said processor to perform the steps of:
        receiving from a local application a request for location information concerning a terminal upon which it is stored;
        consulting a database containing privacy preferences, said database being located in the terminal but having its contents mirrored at one or more remote databases;
        determining whether said local application is entitled to receive the requested location information;
        determining what source from a set of potential sources to use to provide said local application with the requested location information; and
        providing to said local application location information which originated from the determined source in the case where it is determined that said local application is entitled to receive it.

10. The system of claim 9, wherein said determining step includes determining the operational status of each of said potential sources.

11. The system of claim 9, wherein said determining step includes determining the accuracy of the information provided by each of said potential sources.

12. The system of claim 9, wherein said determining step includes determining the cost of obtaining the information from each of said potential sources.

13. A system for providing location information to a remote application or web service comprising:
    a memory having program code stored therein; and
    a processor connected to said memory for carrying out instructions in accordance with said stored program code;
    wherein said program code, when executed by said processor, causes said processor to perform the steps of:
        receiving from a remote application or web service a request for location information concerning a terminal;
        consulting a database not located within the terminal which contains a mirror of the privacy preferences stored in a database located within the terminal;
        determining whether said remote application or web service is entitled to receive the requested location information;
        determining what source from a set of potential sources to use to provide said remote application or web service with the requested location information; and
        providing to said remote application or web service location information which originated from the determined source in the case where it is determined that said remote application or web service is entitled to receive it.

14. The system of claim 13, wherein said determining step includes determining the operational status of each of said potential sources.

15. The system of claim 13, wherein said determining step includes determining the accuracy of the information provided by each of said potential sources.

16. The system of claim 13, wherein said determining step includes determining the cost of obtaining the information from each of said potential sources.

17. A method for providing location information to a local application comprising the steps of:
    receiving from a local application a request for location information concerning a terminal upon which is stored;
    consulting a database containing privacy preferences, said database being located in the terminal but having its contents mirrored at one or more remote databases;
    determining whether said local application is entitled to receive the requested location information; and
    providing said local application with the requested location information in the case where it is determined that said local application is entitled to receive it.

18. A method for providing location information to a remote application or web service comprising the steps of:
    receiving from a remote application or web service a request for location information concerning a terminal;
    consulting a database not located within the terminal which contains a mirror of the privacy preferences stored in a database located within the terminal;
    determining whether said remote application or web service is entitled to receive the requested location information; and
    providing said remote application or web service with the requested location information in the case where it is determined that said remote application or web service is entitled to receive it.

19. A system for providing location information to a local application comprising:
    a memory having program code stored therein; and
    a processor connected to said memory for carrying out instructions in accordance with said stored program code;
    wherein said program code, when executed by said processor, causes said processor to perform the steps of:
        receiving from a local application a request for location information concerning a terminal upon which is stored;
        consulting a database containing privacy preferences, said database being located in the terminal but having its contents mirrored at one or more remote databases;
        determining whether said local application is entitled to receive the requested location information; and
        providing said local application with the requested location information in the case where it is determined that said local application is entitled to receive it.

20. A system for providing location information to a remote application or web service comprising:
    a memory having program code stored therein; and
    a processor connected to said memory for carrying out instructions in accordance with said stored program code;

wherein said program code, when executed by said processor, causes said processor to perform the steps of:

receiving from a remote application or web service a request for location information concerning a terminal;

consulting a database not located within the terminal which contains a mirror of the privacy preferences stored in a database located within the terminal;

determining whether said remote application or web service is entitled to receive the requested location information; and providing said remote application or web service with the requested location information in the case where it is determined that said remote application or web service is entitled to receive it.

* * * * *